No. 650,831. Patented June 5, 1900.
W. H. FRITZ.
SPOKE AND RIM SUPPORTER.
(Application filed Apr. 29, 1897.)
(No Model.)
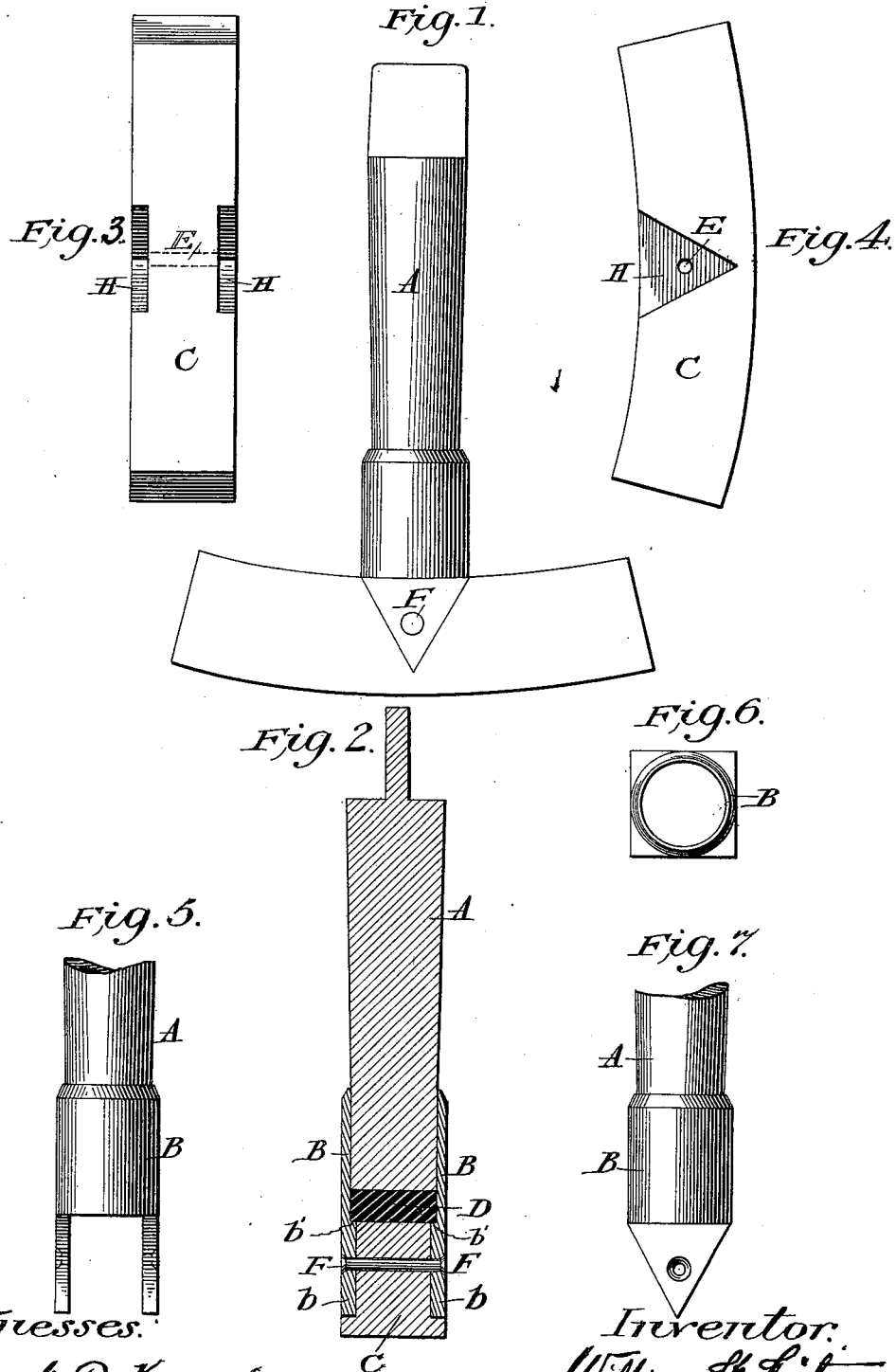

UNITED STATES PATENT OFFICE.

WILLIAM H. FRITZ, OF HARRISBURG, PENNSYLVANIA.

SPOKE AND RIM SUPPORTER.

SPECIFICATION forming part of Letters Patent No. 650,831, dated June 5, 1900.

Application filed April 29, 1897. Serial No. 634,497. (No model.)

*To all whom it may concern:*

Be it known that I, WILLIAM H. FRITZ, a citizen of the United States, residing at Harrisburg, in the county of Dauphin and State of Pennsylvania, have invented and produced a new and useful Improvement in Spoke and Rim Supporters, of which the following is a specification, reference being had to the accompanying drawings of the different parts thereof.

The invention relates to improvements in spoke and rim supporters.

One object of the present invention is to improve the construction of spoke and rim supporters and to provide one in which the spoke will be cushioned and the parts permitted a limited contraction and expansion to prevent a tire from becoming loose and the wheel from becoming dished and at the same time to obviate the necessity of mortising the felly and tenoning the spoke.

A further object of the invention is to extend the cushioning device over the entire area of the end of the spoke and support it against the thimble and the felly and prevent any strain on the fastening device for securing the thimble to the felly.

The invention consists in the construction and novel combination and arrangement of parts, as hereinafter fully described, illustrated in the accompanying drawings, and pointed out in the claim hereto appended.

In the drawings, Figure 1 is an elevation of a portion of a wheel provided with a spoke and rim supporter constructed in accordance with this invention. Fig. 2 is a longitudinal sectional view. Figs. 3 and 4 are detail views of the rim or felly. Fig. 5 is an elevation of the sleeve or thimble, showing the same applied to a spoke. Figs. 6 and 7 are detail views of the same.

Like letters of reference designate corresponding parts in all the figures of the drawings.

A designates a spoke having its outer end of substantially the same diameter and arranged within a sleeve or thimble B, provided with a bore or opening extending entirely through it to enable a cushion D to be directly interposed between the outer end of the spoke and the felly C. The spoke is not reduced to form a tenon, and the felly C is not mortised to receive the same. The thimble, which may be constructed of any suitable metal, is provided at its outer end with a pair of triangular lips or flanges $b$, fitting in triangular recesses H, formed in the side faces of the felly, and providing shoulders or stops to prevent the lips or flanges from moving outward on the felly and straining or otherwise injuring a transverse rivet F, which passes through registering perforations of the same and the felly. The triangular lips or flanges $b$, which are of greater thickness than the walls of the sleeve or thimble, have their outer faces flush with the outer faces of the same and the felly and project inward beyond the inner face of the sleeve or thimble to provide interior supporting-shoulders $b'$, which are flush with the inner face of the felly. The cushion D, which is constructed of rubber, engages the inner face of the felly and is supported by the shoulders $b'$ in order to bear equally against the thimble and the felly, so that the latter will not be forced outward from between the lips or flanges thereof. This construction relieves the transverse rivet of strain, and as the shoulders formed by the triangular recesses prevent the felly from moving inward independently of the thimble any vibration of the rim cannot affect the fastening devices F. The cushion may be made of any desired thickness and is designed to be proportioned to the character of the vehicle to which it is to be applied, and as it is of the same area as the outer end of the spoke there is no liability of it becoming accidentally disengaged from the supporting-shoulders $b'$. Any compression of the cushion due to the vibration of the spoke and the thimble will expand the rubber laterally and crowd it and hold it upon the said shoulders.

The invention has the following advantages: The felly is not mortised, and the spoke, which is of the same diameter throughout its entire length, is not reduced at its outer end to form a tenon and is not weakened. The manner of applying the thimble to the felly and the arrangement of the cushion on the supporting-shoulders of the thimble permits a limited contraction and expansion to prevent a tire from becoming loose and a wheel from becoming dished, and the vibration due to such cushioning action does not affect the fastening device for securing the thimble and felly together. The thimble is exceedingly simple and inexpensive in its construction, and its cost of manufacture is greatly lessened by having the bore or opening extending entirely through it and making substantially a plain thimble.

By having the sides of the felly recessed to receive the flanges the latter come flush at their outer sides with the felly and obviate projecting parts, which accumulate mud and foreign matter and render it difficult to keep the wheel clean. The seating of the flanges within the recesses prevents possible movement of the spoke and thimble lengthwise of the felly. The triangular form of the flanges enables the walls of the recesses II to converge outwardly, whereby a snug fit, as by a wedging action, is secured between the edges of the flanges and the walls of the recesses.

What is claimed is—

The combination with a felly having angular recesses in its opposite sides opening through the inner edge of the felly and the reduced portions thereof directed toward the periphery or rim, the said recesses being disposed in pairs and having their converging walls alined in transverse directions, of a tenonless spoke, a sleeve having a body which is truly cylindrical exteriorly and interiorly to receive the outer end of the spoke and provided with angular flanges at its outer extremity, said flanges being flat and parallel to each other and having their outer faces coinciding with the adjacent plane of the sleeve to avoid the formation of surface projections and thicker than the said sleeve to form internal shoulders to aline in a transverse direction with the inner edge of the felly, the flanges being fitted in the recesses in the felly and having their outer faces flush with the opposite sides of the felly, and an elastic cushion interposed between the outer end of the spoke and the inner edge of the felly and completely inclosed and covered by the sleeve-body, a single fastening being used to secure the flanges.

WILLIAM H. FRITZ.

Witnesses:
E. M. HALLER,
A. BRACKENRIDGE.